United States Patent [19]

Mafoti

[11] Patent Number: 5,098,984
[45] Date of Patent: Mar. 24, 1992

[54] ISOCYANATE TERMINATED PREPOLYMERS AND THE USE THEREOF IN A RIM PROCESS

[75] Inventor: Robson Mafoti, Pittsburgh, Pa.

[73] Assignee: Mobay Corporation, Pittsburgh, Pa.

[21] Appl. No.: 539,100

[22] Filed: Jun. 15, 1990

[51] Int. Cl.$^5$ ............... C08G 18/28; C08G 18/77; C08G 18/81; C08L 75/10
[52] U.S. Cl. ................................ 528/73; 528/44; 528/45; 521/137
[58] Field of Search ............... 528/44, 45, 73; 521/137

[56] References Cited

U.S. PATENT DOCUMENTS

| | | | |
|---|---|---|---|
| 2,801,990 | 8/1957 | Seeger et al. | 260/75 |
| 3,666,726 | 5/1972 | Grogler et al. | 260/77.5 CH |
| 3,691,112 | 9/1972 | Grogler et al. | 260/2.5 AM |
| 3,892,903 | 7/1975 | Dowbenko | 428/460 |
| 4,068,086 | 1/1978 | Dalibor | 560/169 |
| 4,132,843 | 1/1979 | Dalibor | 528/45 |
| 4,218,543 | 8/1980 | Weber et al. | 521/51 |
| 4,284,544 | 8/1981 | Wegner et al. | 528/45 |
| 4,332,965 | 6/1982 | Dalibor | 560/169 |
| 4,396,729 | 8/1983 | Dominquez et al. | 521/51 |
| 4,433,067 | 2/1984 | Rice et al. | 521/51 |
| 4,444,910 | 4/1984 | Rice et al. | 521/51 |
| 4,530,941 | 7/1985 | Turner et al. | 521/176 |
| 4,590,219 | 5/1986 | Nissen et al. | 521/51 |
| 4,774,263 | 9/1988 | Weber et al. | 521/51 |
| 4,857,561 | 8/1989 | Mafoti et al. | 521/159 |
| 4,935,460 | 6/1990 | Cassidy et al. | 524/251 |

FOREIGN PATENT DOCUMENTS 3215907 3/1983 Fed. Rep. of Germany .
3215909 3/1983 Fed. Rep. of Germany .

Primary Examiner—John Kight, III
Assistant Examiner—John M. Cooney, Jr.
Attorney, Agent, or Firm—Joseph C. Gil; Godfried R. Akorli

[57] ABSTRACT

The present invention is directed to a novel prepolymer and the use thereof in a RIM process. The prepolymer is an isocyanate terminated prepolymer having an isocyanate group content of from about 10 to about 26% by weight, and being prepared by a process comprising:

(a) reacting a $C_1$ to $C_5$ alkyl acetoacetate, with a polyol having a molecular weight of from about 500 to about 6000, and a hydroxyl functionality of from 2 to 4, and (b) reacting the resultant product with an organic di- and/or polyisocyanate.

5 Claims, No Drawings

ISOCYANATE TERMINATED PREPOLYMERS AND THE USE THEREOF IN A RIM PROCESS

BACKGROUND OF THE INVENTION

The transesterification reaction between polyols and alkyl acetoacetates is known. See, e.g., U.S. Pat. Nos. 3,892,903, 3,691,112, and 3,666,726. In addition, the reaction of acetoacetic acid esters with isocyanates is also known. See, e.g., U.S. Pat. Nos. 3,892,903, 2,801,990, 4,068,086, 4,132,843, and 4,332,965. In the last four mentioned U.S. patents, blocked isocyanates are prepared via such reaction In the '903 patent, the transesterified products are reacted with crosslinking agents to produce high solids coating compositions. Diisocyanates can be included with the crosslinking agents described.

U.S. Pat. No. 4,218,543 describes the production of reaction injection molded (RIM) products using reaction mixtures of diisocyanates or polyisocyanates based on 4,4'-diisocyanatodiphenyl methane, aromatic polyamines, and relatively high molecular weight polyhydroxyl compounds.

Recent advances in the RIM area have been directed to the substitution of so-called "amino-polyethers" for all or a portion of the relatively high molecular weight polyhydroxyl compounds. See, e.g. U.S. Pat. Nos. 4,774,263, 4,396,729, 4,433,067, 4,444,910, 4,530,941 and 4,590,219; and German Offenlegungsschriften 3,215,907 and 3,215,909. Typically, the isocyanates used with the amino-polyethers have included (i) liquid products made by reacting 4,4'-diphenylmethane diisocyanate with tripropylene glycol, (ii) liquid modified 4,4'-diphenylmethane diisocyanates containing carbodiimide groups and (iii) prepolymers from 4,4'-diphenylmethane diisocyanate and polyethers (see the first five references noted in this paragraph). U.S. Pat. No. 4,590,219 also describes the use of a prepolymer from 4,4'-diphenylmethane diisocyanate and a diethylene glycol adipate (having an OH number of 42).

Recently, our company has evaluated the use of a prepolymer derived from 4,4'-diphenylmethane diisocyanate, a polyester (having a molecular weight of 2000 and produced from adipic acid, ethylene glycol, and butanediol), and a carbodiimidized 4,4'-diphenylmethane diisocyanate Finally, U.S. Pat. No. 4,857,561 describes prepolymers derived from MDI and neopentyl adipate polyesters and the use thereof in a RIM process.

DESCRIPTION OF THE INVENTION

The present invention is directed to novel terminated prepolymers and to the use thereof in a RIM process. More particularly, the present invention is directed to a novel isocyanate terminated prepolymer having an isocyanate group content of from about 10 to about 26% by weight, and being prepared by a process comprising:

(a) reacting a $C_1$ to $C_5$ alkyl acetoacetate, and preferably a $C_1$ to $C_4$ alkyl acetoacetate with a polyol having a molecular weight of from about 500 to about 6000, preferably from 1000 to 4800, and a hydroxyl functionality of from 2 to 4, preferably in a ratio such that one mole of acetoacetate is used for each hydroxyl group present, and (b) reacting the resultant product with an organic di-and/or polyisocyanate.

The invention also relates to a method of making a reaction injection molded ("RIM") part by reacting in a closed mold (i) a relatively high molecular weight active hydrogen containing material, (ii) an amine terminated chain extender, and (iii) the prepolymer of the present invention. Finally, the invention is directed to the product made by the above RIM process.

The reaction product of step (a) useful herein is produced by techniques generally known in the art For example the acetoacetic acid esters may be produced according to the processes described in U.S. Pat. Nos. 3,666,726, 3,691,112, and 3,892,903, the disclosures of which are herein incorporated by reference. In general, they are produced by transesterifying alkyl acetoacetates with polyols. In general, the transesterification reaction is conducted at temperatures ranging form 160° to 210° C. for periods of time ranging from 2 to 10 hours. If desired, transesterification catalysts, such as dibutyltin oxide and tetrabutyl titanate, can be used.

The polyols useful in producing the reaction products of step (a) are of the type generally used in polyurethane chemistry. The polyols useful herein typically have molecular weights of from 500 to 6,000 and have hydroxyl functionalities of from 2 to 4. Examples of suitable compounds include the polyesters, polyethers, polythioethers, polyacetals and polycarbonates containing 2 to 4 hydroxyl groups of the type known for the production of polyurethanes. The polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include low molecular weight diols, triols and tetrols, 4,4'-dihydroxy diphenyl propane, aniline, ammonia, ethanolamine and ethylene diamine.

Suitable examples of polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied polyols which may be used in accordance with the invention may be found for example in High Polymers, Volume XVI, "Polyurethanes, Chemistry and Technology," by Saunders-Frisch, Interscience Publishers, New York, London, Vol. I, 1962, pages 32-42 and 44-54, and Volume II, 1964, pages 5-6 and 198-199; and in Kunststoff-Handbuch, Vol. VII, Vieweg-Hochtlen, Carl Hanser Verlag, Munich, 1966, pages 45-71.

The products of step (a) are prepared by transesterifying any of the above noted polyols with lower alkyl acetoacetates. By "lower alkyl" is meant alkyl groups containing from one to five carbon atoms. Specific useful acetoacetates include ethyl acetoacetate, t-butyl acetoacetate, propyl acetoacetate, n-butyl acetoacetate, isobutyl acetoacetate, methyl acetoacetate and the like. As noted above, in preparing the acetoacetic acid esters herein, transesterification catalysts may be necessary. In preparing the transesterified product, it is generally preferred that the reactants be used in amount such that one OH group is present for each acetoacetate group. However, it is also possible to use excess amounts of either reactant. In fact, in some cases it is preferred to use an excess of the acetoacetate to ensure complete reaction.

Suitable isocyanate components include compounds corresponding to the following formula:

wherein n=2-4, preferably 2, and

Q is an aliphatic hydrocarbon radical containing 2 to 18 (preferably 6 to 10) carbon atoms, a cycloaliphatic hydrocarbon radical containing 4 to 15 (preferably 5 to 10) carbon atoms, an aromatic hydrocarbon radical containing 6 to 15 (preferably 6 to 13) carbon atoms or an araliphatic hydrocarbon radical containing 8 to 15 (preferably 8 to 13) carbon atoms.

Particularly preferred isocyanates are hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers; diphenylmethane-2,4'- and/or -4,4'-diisocyanate; naphthylene-1,5-diisocyanate; triphenylmethane-4,4',4"-triisocyanate; and polyphenyl polymethylene polyisocyanates of the type obtained by phosgenation of aniline-formaldehyde condensates.

Suitable relatively high molecular weight polyisocyanates are modification products of the above isocyanates, such as polyisocyanates containing isocyanurate, carbodiimide, allophanate, biuret or uretdione structural units. These modified isocyanates are prepared by methods generally known in the art.

Particularly preferred isocyanates are the commercially available polyisocyanates typically used in polyurethane chemistry, such as hexamethylene diisocyanate; 1-isocyanato-3,3,5-trimethyl-5-isocyanatomethyl cyclohexane (isophorone diisocyanate or IPDI); 4,4'-diisocyanatodicyclohexyl methane; 2,4-diisocyanatotoluene, and mixtures thereof with 2,6-diisocyanatotoluene; 4,4'-diisocyanato-diphenyl-methane, and mixtures thereof with the corresponding 2,4'- and 2,2'-isomers: polyisocyanate mixtures of the diphenylmethane series, of the type obtained by phosgenation of aniline/formaldehyde condensates; the biuret, or isocyanurate-containing modification products of these polyisocyanates; and mixtures of these polyisocyanates.

The prepolymers are prepared by reacting the isocyanate with the transesterified product at temperatures of from 25° C. to 125° C. The resultant prepolymer has an isocyanate group content of from about 10% to about 26% by weight, and preferably from about 16 to about 23% by weight. In one particularly preferred embodiment, methylene-bis(phenyl-isocyanate) is first reacted with the transesterified product to a lower isocyanate content. Thereafter polymethylenepoly-(phenylisocyanate) is added to raise the isocyanate content to the 10 to 26% level. When a transesterification catalyst is not used in step (a), a catalyst will generally be necessary to catalyze the reaction between the isocyanate groups and the transesterified product. Typical of such catalysts are basic catalysts of the type known in the art such as sodium methoxide and sodium ethoxide. Sodium methoxide is the presently preferred catalyst. If the reaction is catalyzed by addition of a basic catalyst of the type noted, the catalyst will generally have to be neutralized after the reaction is complete. Typical of the materials used to neutralize such basic catalysts is benzoyl chloride.

The prepolymers of the present invention can be reacted in a closed mold via the RIM process with (i) a relatively high molecular weight active hydrogen containing material, and (ii) an amine terminated chain extender.

The high molecular weight active hydrogen group-containing compounds (i) generally have molecular weights of from 1000 to 12,000 and include compounds containing amino groups, thiol groups, carboxyl groups and hydroxyl groups.

The compounds used as component (i) in the process according to the present invention are preferably polyhydroxyl polyethers or polyamino polyethers having molecular weights of from 1000 to 12,000, and most preferably from 3000 to 7000. Polyethers are particularly suitable for the process of the present invention. Preferred are those having at least 2, and preferably 2 or 3 hydroxyl or amino groups. Polyhydroxyl polyethers are known and may be prepared, e.g., by polymerization of epoxides, such as ethylene oxide, propylene oxide, butylene oxide, tetrahydrofuran, styrene oxide or epichlorohydrin, either on their own, e.g. in the presence of $BF_3$, or by a process of chemical addition of these epoxides, optionally as mixtures or successively, to starting components having reactive hydrogen atoms, such as water, ammonia, alcohols, or amines. Examples of suitable starting components include ethylene glycol, propylene glycol-(1,3) or -(2,3), trimethylolpropane, glycerin, 4,4'-dihydroxydiphenyl propane, aniline, ethanolamine or ethylene diamine. Sucrose polyethers which have been described in German Auslegeschriften No. 1,176,358 and No. 1,064,938 may also be used according to the present invention. It is in many cases preferred to use polyethers which contain predominant amounts of primary OH groups (up to 90%, by weight, based on all the OH groups present in the polyether). Polyethers modified with vinyl polymers are also suitable. These may be obtained, for example, by the polymerization of styrene and acrylonitrile in the presence of polyethers (U.S. Pat. Nos. 3,383,351; 3,304,273; 3,523,083 and 3,110,695; and German Patent No. 1,152,536). Polybutadienes having OH groups may also be used.

According to the present invention, there may also be used polyhydroxyl compounds which contain high molecular weight polyadducts or polycondensates in a finely dispersed form or in solution. Such modified polyhydroxyl compounds are obtained when polyaddition reactants (e.g., reactions between polyisocyanates and amino functional compounds) or polycondensation reactions (e.g., between formaldehyde and phenols and/or amines) are directly carried out in situ in the above-mentioned hydroxyl compounds. Processes for the production of this type of material have been described in German Auslegeschriften No. 1,168,075 and No. 1,260,142 and in German Offenlegungsschriften Nos. 2,324,134; 2,423,984; 2,512,385; 2,513,815; 2,550,796; 2,550,797; 2,550,833 and 2,550,862. Such polyhydroxyl compounds may also be obtained according to U.S. Pat. No. 3,869,413 or German Offenlegungsschrift No. 2,550,860 by mixing an aqueous polymer dispersion with a polyhydroxyl compound and then removing water from the mixture.

According to the present invention, hydroxyl-containing polyesters, polythioethers, polyacetals, polycarbonates or polyester amides of the type known for the production of both homogeneous and cellular polyurethanes may also be used instead of or together with polyether polyols. Suitable polyesters containing hydroxyl groups include, reaction products of polyhydric, (preferably dihydric alcohols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or may be unsaturated. The following are mentioned as examples: succinic acid, adipic acid, suberic acid, azelaic acid, sebacic acid, phthalic acid, isophthalic acid, trimellitic acid, phthalic acid anhydride, tetra-hydrophthalic acid anhydride, hexahydrophthalic acid anhydride, tetrachlorophthalic acid anhydride, endo-methylene tetrahydrophthalic acid anhydride, glutaric acid anhydride, maleic acid, maleic acid anhydride, fumaric acid, dimeric and trimeric fatty acids, dimethyl terephthalic and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentyl-glycol, cyclohexanedimethanol (1,4-bis-hydroxymethyl-cyclohexane), 2-methyl-1,3-propane-diol, glycerol, trimethylolpropane, hexanetriol-(1,2,6), butane-triol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as δ-caprolactone or hydroxycarboxylic acids such as ω-hydroxycaproic acid may also be used.

Where polyesters are used as component (i), it is preferred to use polyesters similar to the polyester used to make the prepolymer. Additionally, other hydrolytically stable polyesters are preferably used in order to obtain the greatest benefit relative to the hydrolytic stability of the final product.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio-mixed ethers, polythioether esters or polythioether ester amides, depending on the co-components.

Suitable polyacetals include, for example, the compounds which may be prepared from glycols, such as diethylene glycol, triethylene glycol and hexanediol, and formaldehyde. Suitable polyacetals for the purpose of the present invention may also be prepared by the polymerization of cyclic acetals.

The polycarbonates containing hydroxyl groups used may be of the type known. Highly useful are those which may be prepared by the reaction of diols, such as propanediol-(1,3), butane-(1,4) and/or hexanediol-(1,6), diethylene glycol, triethylene glycol or tetraethylene glycol with diarylcarbonates, e.g. diphenylcarbonate, or phosgene.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines and mixtures thereof.

Representatives of the hydroxyl functional compounds which may be used in the RIM process according to the present invention are generally known and have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, on pages 45 to 71.

Also preferred are polyethers containing primary and/or secondary (preferably primary) aromatically or aliphatically (preferably aliphatically) bound amino groups.

Compounds containing amino end groups may also be attached to the polyether chains by urethane or ester groups. These "amino polyethers" may be prepared by known methods. One such method is the amination of polyhydroxy polyethers (e.g., polypropylene glycol ethers) by a reaction with ammonia in the presence of Raney nickel and hydrogen (Belgian Patent No. 634,741). U.S. Pat. No. 3,654,370 discloses the preparation of polyoxyalkylene polyamines by reaction of the corresponding polyol with ammonia and hydrogen in the presence of a nickel, copper or chromium catalyst. The preparation of polyethers containing amino end groups by the hydrogenation of cyanoethylated polyoxypropylene ethers is described in German Pat. No. 1,193,671. Other methods for the preparation of polyoxyalkylene (polyether) amines are described in U.S. Pat. Nos. 3,155,728 and 3,236,895 and French Pat. No. 1,551,605. French Patent No. 1,466,708, discloses the preparation of polyethers containing secondary amino end groups.

Relatively high molecular weight polyhydroxypolyethers suitable for the process of the present invention may be converted into the corresponding anthranilic acid esters by reaction with isatoic acid anhydride. German Offenlegungsschriften Nos. 2,019,432 and 2,619,840 and U.S. Pat. Nos. 3,808,250; 3,975,428 and 4,016,143 discloses methods for making polyethers containing aromatic amino end groups.

Relatively high molecular weight compounds containing amino end groups may be obtained according to German Offenlegungsschrift Nos. 2,546,536 or U.S. Pat. No. 3,865,791 by reacting isocyanate prepolymers based on polyhydroxy polyethers with hydroxyl-containing enamines, aldimines or ketimines and hydrolyzing the reaction product.

The aminopolyethers which have been obtained by the hydrolysis of compounds containing isocyanate end groups are preferred starting materials (German Offenlegungsschrift No. 2,948,419). Polyethers preferably containing two or three hydroxyl groups are reacted (in the process disclosed in German Offenlegungsschrift No. 2,948,419) with polyisocyanates to form isocyanate prepolymers and the isocyanate group is then converted in a second step into an amino group by hydrolysis.

The "amino polyethers" used in the present invention are in many cases mixtures of the compounds described above. These mixtures generally should contain (on a statistical average) two to three isocyanate reactive end groups.

In the process of the present invention, the "amino polyethers" may also be used as mixtures with polyhydroxyl polyethers which are free from amino groups.

The amine terminated chain extender used as component (ii) in the process of the present invention generally has a molecular weight from 108 to 400 and preferably contains exclusively aromatically bound primary or secondary (preferably primary) amino groups. Examples of such diamines are: 1,4-diaminobenzene, 2,4-diaminotoluene, 2,4'- and/or 4,4'-diaminodiphenyl methane, 3,3'-dimethyl 4,4'-diaminodiphenyl methane, 4,4'-diaminodiphenyl propane-(2,2) t-butyl toluene diamine, 1-methyl-3,5-bis(methylthio)-2,4- and/or 2,6-diaminobenzene, and mixtures of such diamines.

The preferred diamines have alkyl substituents in at least one position which is ortho to the amino groups. The most preferred diamines are those in which at least one alkyl substituent is present in the position ortho to the first amino group and two alkyl substituents are located in the position ortho to the second amino group, each alkyl substituent having 1 to 3 carbon atoms. It is particularly preferred to use such compounds in which an ethyl, n-propyl and/or isopropyl substituent is present in at least one position ortho to the amino groups and possibly methyl substituents in other positions ortho to the amino groups.

Specific examples of preferred amines are: 2,4-diaminomesitylene, 1,3,5-triethyl-2,4-diamino-benzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenyl methane, 3,5,3',5'-tetraisopropyl-4,4'-diaminodiphenyl methane and 3,5-diethyl-3',5'-diisopropyl-4,4-diaminodiphenyl methane.

The above-mentioned aromatic diamines may, of course, also be used as mixtures. It is particularly preferred to use 1-methyl-3,5-diethyl-2,4-diaminobenzene or a mixture of this compound with 1-methyl-3,5-diethyl-2,6-diaminobenzene.

The diamine chain lengthening agent in the RIM process of the present invention is preferably used in quantities of from 5 to 50 wt. %, most preferably from 10 to 40 wt. % (based on the weight of component (i)).

Internal mold release agents may be used to produce molded articles which have excellent mold release characteristics. Such internal mold release agents are among the auxiliary agents which may advantageously be used in the process of the present invention. In principle, any mold release agent known in the art may be used in the present invention but internal mold release agents such as those described, for example, in German Offenlegungsschrift No. 1,953,637 (U.S. Pat. No. 3,726,952), German Offenlegungsschrift 2,121,670 (British Patent 3,365,215), German Offenlegungsschrift 2,431,968 (U.S. Pat. No. 4,098,731) or in German Offenlegungsschrift 2,404,310 (U.S. Pat. No. 4,058,492) are preferred. Preferred mold release agents include the salts (containing at least 25 aliphatic carbon atoms) of fatty acids having at least 12 aliphatic carbon atoms and primary mono-, di- or polyamines containing two or more carbon atoms or amines containing amide or ester groups and having at least one primary, secondary or tertiary amino group; esters of mono- and/or polyfunctional carboxylic acids and polyfunctional alcohols containing saturated and/or unsaturated COOH and/or OH groups and having hydroxyl or acid numbers of at least five, ester type reaction products of ricinoleic acid and long chained fatty acids; salts of carboxylic acids and tertiary amines; and natural and/or synthetic oils, fats or waxes.

The oleic acid or tall oil fatty acid salts of the amine containing amide groups which has been obtained by the reaction of N-dimethylaminopropylamine with oleic acid or tall oil fatty s acid is particularly preferred.

Apart from the above-described preferred mold release agents, other mold release agents known in the art may in principle be used either alone or in a mixture with the preferred mold release agents. These additional mold release agents include, for example, the reaction products of fatty acid esters with polyisocyanates (according to German Offenlegungsschrift 2,319,648); the reaction products of polysiloxanes containing reactive hydrogen atoms with mono-and/or polyisocyanates (according to German Offenlegungsschrift 2,356,692 (U.S. Pat. No. 4,033,912)); esters of mono- and/or polycarboxylic acids and polysiloxanes containing hydroxy methyl groups (according to German Offenlegungsschrift 2,363,452 (U.S. Pat. No. 4,024,090)); and salts of polysiloxanes containing amino groups and fatty acids (according to German Offenlegungsschrift 2,417,273 or German Offenlegungsschrift 2,431,968 (U.S. Pat. No. 4,098,731)).

Also preferred are the zinc salts, e.g., zinc stearate, described in U.S. Pat. Nos. 4,581,386 and 4,519,965.

If an internal mold release agent is used, it is generally used in an amount which totals from 0.1 to 25 wt. %, preferably 1 to 10 wt. % of the whole reaction mixture.

No catalyst is required for the reaction between isocyanate groups and isocyanate reactive groups of the reactants. However, catalysts known and commonly used in the production of polyurethane foams and microcellular elastomers are included in the group of auxiliary agents and additives appropriate to the present invention.

Suitable catalysts include tertiary amines such as triethylamine, tributylamine, N-methyl-morpholine, N-ethyl-morpholine, N-cocomorpholine, N,N,N',N'-tetramethylene diamine, 1,4-diazabicyclo-(2,2,2)-octane, N-methyl-N'-dimethyl-aminoethyl piperazine, N,N'-dimethylbenzylamine, bis-(N,N-diethyl-aminoethyl)-adipate, N,N-diethyl benzylamine, pentamethyl diethylene triamine, N,N-dimethyl-cyclohexylamine, N,N,N',N'-tetramethyl-1,3-butanediamine, N,N-dimethylimidazolephenyl-ethylamine, 1,2-dimethylimidazole and 2-methylimidazole.

Organometallic catalysts may also be used in the practice of the present invention. Particularly useful organometallic catalysts include organic tin catalysts such as tin-(II) salts of carboxylic acids (e.g., tin-(II)-acetate, tin-(II)-octoate, tin-(II)-ethyl hexoate and tin-(II)-laurate) and the dialkyl tin salts of carboxylic acids (e.g., dibutyl-tin-diacetate, dibutyl-tin-dilaurate, dibutyl-tin-maleate or dioctyl-tin-diacetate) alone or in combination with tertiary amines. Other suitable catalysts and details concerning the action of these catalysts are given in Kunststoff Handbuch, Volume VII, published by Vieweg and Hochtlen, Carl Hanser Verlag, Munich 1966, e.g., on pages 96 to 102.

If a catalyst is used, quantities of about 0.001 to 10 wt. %, preferably 0.05 to 1 wt. % (based on component (i)) are appropriate.

The products of the process of the present invention are preferably compact molded articles. However, blowing agents may be used to produce molded articles having a compact surface and a cellular interior. The blowing agents used may be water and/or readily volatile organic substances and/or dissolved inert gases.

Examples of suitable organic blowing agents include acetone; ethylacetate; methanol; ethanol; halogen-substituted alkanes such as methylene chloride, chloroform, ethylidene chloride, vinylidene chloride, monofluorotrichloromethane, chlorodifluoromethane and dichlorodifluoromethane; and butane, hexane, heptane or diethyl ether.

Nitrogen, air and carbon dioxide are examples of suitable inert gases.

The effect of a blowing agent may also be obtained by the addition of compounds which decompose at temperatures above room temperature to release gases, for example, nitrogen. Azo compounds such as azoisobutyric acid nitrile are examples of such compounds. Other examples of blowing agents and details concerning the use of blowing agents may be found in Kunststoff Handbuch, Volume VII, published by Vieweg and Hochtlen, Carl Hanser Verlag, Munich 1966, e.g., on pages 108 and 109, 453 to 455 and 507 to 510.

In accordance with the present invention, surface active additives (emulsifiers and foam stabilizers) may also be used as reaction mixture components. Suitable emulsifiers include the sodium salts of ricinoleic sulfonates or of fatty acids or salts of fatty acids and amines (such as oleic acid diethylamine or stearic acid diethanolamine). Alkali metal or ammonium salts of sulfonic acids (e.g., of dodecyl benzene sulfonic acid or of dinaphthyl methane disulfonic acid) or of fatty acids such as ricinoleic acid or of polymeric fatty acids may also be used as surface active additives.

If foam stabilizers are used, it is preferred that they be water soluble polyether siloxanes. These compounds are generally a copolymer of ethylene oxide and propylene oxide linked to a polydimethyl siloxane group. Foam stabilizers of this type are described in U.S. Pat. No. 2,764,565.

Other auxiliary agents and additives which may optionally be used in the RIM process of the present invention include known cell regulators (such as paraffins or fatty alcohols or dimethyl polysiloxanes), known pigments, dyes and flame retarding agents (e.g., trischloroethyl phosphate or ammonium phosphate and polyphosphate), stabilizers against ageing and weathering, plasticizers, fungistatic and bacteriostatic substances, and fillers (such as barium sulfate, glass fibers, kieselguhr or whiting).

Other examples of suitable surface active additives and foam stabilizers, flame retardants, plasticizers, dyes, fillers and fungistatic and bacteriostatic substances and details concerning the use and mode of action of these additives may be found in Kunststoff Handbuch, Volume VII, published by Vieweg and Hochtlen, Carl Hanser Verlag, Munich 1966, e.g., on pages 103 to 113.

Examples of other auxiliary agents and additives which may be used include low molecular weight polyhydric alcohols having a molecular weight of from 62 to 500, preferably from 62 to 400 (in quantities of up to 50 equivalent percent, based on the isocyanate reactive groups of the diamine used as component (ii)) in addition to the chain lengthening agent (component (ii)) to modify the properties of the molded articles. Ethylene glycol, butane-1,4-diol, hexamethylene glycol, trimethylolpropane, diethylene glycol, triethylene glycol, dipropylene glycol, tripropylene glycol, the propoxylation products of trimethylol propane having molecular weights of up to 500 preferably of up to 400 or the propoxylation products of ethylene diamine having molecular weights of up to 500 preferably of up to 400 are examples of such alcohols. The addition of such low molecular weight polyhydroxyl compounds is, however, less preferred.

When carrying out the process of the present invention, the quantity of prepolymer should preferably be such that the isocyanate index is from 70 to 130, most preferably 90 to 110 in the reaction mixture. By "isocyanate index" is meant the quotient of the number of isocyanate groups divided by the number of isocyanate reactive groups, multiplied by 100. When calculating the isocyanate index, any isocyanate reactive groups possibly present in the mold release agents (carboxyl groups) are not taken into account.

The process of the present invention is carried out by the known reaction injection molding technique (RIM process). Two streams are generally employed in this molding technique. In the present invention, the prepolymer is the first stream and components (i) and (ii) make up the second stream. If any auxiliary agents or additives are used, they are generally mixed with components (i) and (ii). However, it may be advantageous, for example when using a mold release agent containing isocyanate groups, to incorporate the release agent with the prepolymer before the RIM process is carried out. It is possible in principle to use mixing heads in which three or four separate components may be simultaneously introduced so that no preliminary mixing of the individual components is required. The quantity of reaction mixture introduced into the mold is generally calculated to produce molded articles having a density of from 0.8 to 1.4 g/cm$^3$, preferably from 0.9 to 1.2 g/cm$^3$. When mineral fillers are used, however, the molded articles may have a density above 1.2 g/cm$^3$. The articles may be removed from the mold after they have been left in there from 5 to 90 seconds, preferably from 20 to 60 seconds.

The reaction mixture is generally introduced into the mold at a starting temperature of from 10° to 60° C., preferably from 20° to 50° C. The temperature of the mold itself is generally from 40° to 100° C., preferably from 50° to 70° C.

The molded articles obtainable by the process of the present invention are particularly suitable for the manufacture of flexible automobile bumpers or car body parts. Appropriate variations of the starting components makes it possible, however, to obtain flexible shoe soles with good abrasion resistance and excellent mechanical strength.

The invention is further illustrated but is not intended to be limited by the following examples in which all parts and percentages are by weight unless otherwise specified.

EXAMPLES

In the examples showing the production of the transesterified product, the apparatus used consisted of (i) a vacuum jacketed distillation column with metal packing, (ii) a variable reflux ratio distilling head with a round bottom flask attached to receive alkanol and excess alkyl acetoacetate, (iii) a three neck flask, and (iv) a thermoregulator, a heating mantle, and a dropping funnel.

EXAMPLE 1

A five liter flask was charged with 3321 parts of a 2000 molecular weight neopentyl glycol/adipic acid polyester diol. 385 parts of methyl acetoacetate and 0.4 parts of dibutyl tin oxide catalyst were charged into the dropping funnel. Nitrogen was bubbled through the flask, and the temperature was raised to 160° C. The acetoacetate/tin mixture was then added to the polyester dropwise and the methanol released due to the transesterification was collected in the receiving flask. At the end of the addition, the reaction was allowed to continue for about one hour. Vacuum was slowly applied to remove residual methanol and unreacted methyl acetoacetate. The product was characterized by IR. The disappearance of the hydroxyl peak around 3500-3400 cm$^{-1}$ indicated the completion of the reaction. The viscosity of the transesterified product was about 2250 mPa.s at 25° C., compared to a viscosity of 12,000 mPa.s at 25° C. for the neopentyl adipate polyester.

EXAMPLE 2

A twelve liter flask was charged with 7500 parts of a a glycerine/propylene oxide/ethylene oxide triol having an OH number of 35 (weight ratio of propylene oxide to ethylene oxide of 83:17 with the oxides being reacted sequentially, i.e., propylene oxide and then ethylene oxide). 740 parts of t-butyl acetoacetate were charged into the dropping funnel. Nitrogen was bubbled through the flask, and the temperature was raised to 160° C. The acetoacetate was then added to the polyether dropwise and the t-butanol released due to the transesterification was collected in the receiving flask. At the end of the addition, the reaction was allowed to continue for about one hour. Vacuum was slowly applied to remove residual t-butanol and unreacted t-butyl acetoacetate. The product was characterized by IR. The disappearance of the hydroxyl peak around 3500-3400 cm$^{-1}$ indicated the completion of the reaction. The viscosity of the transesterified product was about 400 mPa.s at 25° C., compared to a viscosity of 800 mPa.s at 25° C. for the polyether.

EXAMPLE 3

A twelve liter flask was charged with 3000 parts of 2000 molecular weight polyoxypropylene glycol. 400 parts of methyl acetoacetate and 0.5 parts of dibutyl tin oxide catalyst were charged into the dropping funnel. Nitrogen was bubbled through the flask, and the temperature was raised to 160° C. The acetoacetate/tin mixture was then added to the polyester dropwise and the methanol released due to the transesterification was collected in the receiving flask. At the end of the addition, the reaction was allowed to continue for about one hour. Vacuum was slowly applied to remove residual methanol and unreacted methyl acetoacetate. The product was characterized by IR. The disappearance of the hydroxyl peak around 3500-3400 cm$^{-1}$ indicated the completion of the reaction. The viscosity of the transesterified product was about 200 mPa.s at 25° C., compared to a viscosity of 320 mPa.s at 25° C. for the polyether.

EXAMPLE 4

3682 parts of 4,4'-methylenebis(phenyl isocyanate) and 1500 parts of a polymethylenepoly(phenyl isocyanate) having an isocyanate group content of 31.9% by weight, an equivalent weight of 132 and a viscosity at 25° C. of 80 mPa.s (a commercially available polyisocyanate sold as "Mondur MRS-4") were charged into a twelve liter flask provided with a stirrer. Nitrogen was bubbled through the flask and the temperature was raised to 60° C. 2318 parts of the product of Example 1 were added to the rapidly stirring mixture. The reaction mixture was held at 60° C. for about one hour. The % NCO was 21.6% by weight and the viscosity of the product was 100 mPa.s at 25° C. The viscosity of a prepolymer made from the same isocyanates and an equivalent amount of the untransesterified polyester was 1100 mPa.s at 25° C.

EXAMPLE 5

2515 parts of 4,4'-methylenebis(phenyl isocyanate) and 1050 parts of the same polymethylenepoly(phenyl isocyanate) used in Example 4 were charged into a twelve liter flask provided with a stirrer. Nitrogen was bubbled through the flask and the temperature was raised to 60° C. 1685 parts of the product of Example 2 and 0.1 part of sodium methoxide were added to the rapidly stirring mixture. The reaction mixture was held at 60° C. for about one hour. Once the theoretical NCO content was reached, 0.54 parts of benzoyl chloride were added, and the mixture was held at 60° C. for another 15 minutes. The % NCO was 22.3% by weight and the viscosity of the product was 200 mPa.s at 25° C. The viscosity of a prepolymer made from the same isocyanates and an equivalent amount of the untransesterified polyether was 800 mPa.s at 25° C.

EXAMPLE 6

2577 parts of 4,4'-methylenebis(phenyl isocyanate) and 1050 parts of the same polymethylenepoly(phenyl isocyanate) used in Example 4 were charged into a twelve liter flask provided with a stirrer. Nitrogen was bubbled through the flask and the temperature was raised to 60° C. 1623 parts of the product of Example 3 and 0.1 part of sodium methoxide were added to the rapidly stirring mixture. The reaction mixture was held at 60° C. for about one hour. Once the theoretical NCO content was o reached, 0.54 parts of benzoyl chloride were added, and the mixture was held at 60.C for another 15 minutes. The % NCO was 22.8% by weight and the viscosity of the product was 250 mPa.s at 25° C. The viscosity of a prepolymer made from the same isocyanates and an equivalent amount of the untransesterified polyether was 450 mpa.s at 25° C.

EXAMPLES 7 THROUGH 12

In Examples 7 through 12, in addition to the prepolymers of Examples 4, 5 and 6, the following additional materials were used:
i) ATP: an amine terminated polyether having an amine number of about 43 and being prepared by hydrolyzing a prepolymer formed from toluene diisocyanate and a 2:1 mixture of a trimethylolpropane/propylene oxide polyether (OH number of 56) and a glycerin/propylene oxide/ethylene oxide polyether (OH number of 35 and having primary hydroxy group termination).

ii) nFTDA an 80:20 mixture of 1-methyl-3,5-diethyl-2,4- and 2,6- phenylene diamine.
iii) EDA/PO: a reaction product Of ethylene diamine and propylene oxide having an OH number of about 630.
iv) Zn: zinc stearate.
v) DB OIL: a castor oil available from Caschem.
vi) L5304: a silicone surfactant available from Union Carbide.
vii) ISO A: a blend of 80 parts by weight of 4,4'-methylenebis(phenyl isocyanate) and 20 parts by weight of the polymethylenepoly(phenyl isocyanate) used in Example 4, with the blend having an NCO content of about 33% by weight.
viii) ISO B: a prepolymer prepared by (i) first reacting 252 parts of 4,4'-methylenebis(phenylisocyanate), 27 parts of a liquid modified 4,4'-methylenebis(phenylisocyanate) containing carbodiimide groups and having an isocyanate group content of 29.3% and a viscosity at 25° C. of less than 100 mPa.s and 169 parts of a polyester diol (having a molecular weight of 2000 and being prepared from adipic acid, ethylene glycol and 1,4-butanediol), and (ii) then blending 4800 parts of the resultant product with 1200 parts of a polymethylene poly(phenylisocyanate) having an isocyanate group content of 31.9%, an equivalent weight of 132, and a viscosity at 25° C. of 80 mPa.s, to yield a final product having an isocyanate content of 21.6%.
ix) ISO C: a prepolymer prepared by reacting 1866 parts of 4,4'-methylenebis(phenylisocyanate), 750 parts of the polymethylenepoly(phenylisocyanate) used in Example 4, and 1134 parts of a polyester diol (having a molecular weight of 2000 and being prepared from adipic acid and neopentyl glycol), with the prepolymer having an isocyanate content of 21.6% by weight.

RIM plaques were prepared using a laboratory piston metering unit and clamping unit. The metering unit was a two component instrument having a maximum metering capacity of 0.6 liters. A rectangular mold, 300 mm×200 mm×3 mm was used to mold the samples under the following conditions:

| Component A (prepolymer) temperature | 40° C. |
| Component B temperature | 60° C. |
| Isocyanate index | 105 |
| Mold temperature | 65° C. |
| Demold time | 45 sec |

The formulations used and the physical properties were as indicated in the following table. The samples were tested for density (ASTM D-792), flex modulus (ASTM D-79D), elongation (ASTM D-638), heat sag (ASTM D-3769), and notched Izod (ASTM D-256). Examples 7, 10 and 12 are comparative examples.

TABLE

| | Example | | | | | |
|---|---|---|---|---|---|---|
| | 7 | 8 | 9 | 10 | 11 | 12 |
| ATP | 65.75 | 65.75 | 65.75 | 65.75 | 65.75 | 65.75 |
| DETDA | 26 | 26 | 26 | 26 | 26 | 26 |
| EDA/PO | 3 | 3 | 3 | 3 | 3 | 3 |
| ZN | 2.5 | 2.5 | 2.5 | 2.5 | 2.5 | 2.5 |
| L5304 | 0.75 | 0.75 | 0.75 | 0.75 | 0.75 | 0.75 |
| DB OIL | 2 | 2 | 2 | 2 | 2 | 2 |
| ISO A | 75.3 | — | — | — | — | — |
| Prepolymer of Example 2 | — | 72.6 | — | — | — | — |
| Prepolymer of Example 3 | — | — | 71.0 | — | — | — |
| Prepolymer of Example 4 | — | — | — | — | 71.6 | — |
| ISO B | — | — | — | 75.3 | — | — |
| ISO C | — | — | — | — | — | 79.6 |
| RESULTS: | | | | | | |
| Density gm/cm³ | 1.12 | 1.10 | 1.09 | 1.12 | 1.12 | 1.11 |
| Flex. mod N/mm² | 559 | 483 | 454 | 646 | 700 | 777 |
| Elong., % | 140 | 143 | 167 | 135 | 175 | 133 |
| Izod N-mm/mm | 435 | 311 | 345 | 325 | 255 | 332 |
| Heat Sag 10 cm, 163° C. 1 hr., mm | 196 | 196 | 216 | 114 | 234 | 310 |
| Heat Sag 15 cm, 121° C. 1 hr, mm | 135 | 178 | 254 | 97 | 211 | 259 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate terminated prepolymer having an isocyanate group content of from about 10 to about 26% by weight, and being prepared by a process consisting essentially of comprising:
    (a) reacting a $C_1$ to $C_5$ alkyl acetoacetate, with a polyol having a molecular weight of from about 500 to about 6000, and a hydroxyl functionality of from 2 to 4, and
    (b) reacting the resultant product with an organic-di-and/or polyisocyanate.

2. The prepolymer of claim 1, wherein said acetoacetate is a $C_1$ to $C_4$ alkyl acetoacetate, and wherein said polyol has a molecular weight of from 1000 to 4800.

3. The prepolymer of claim 1, wherein the acetoacetate is reacted with the polyol in a ratio such that one mole of acetoacetate is used for each hydroxyl group present, 4. The prepolymer of claim 1 wherein said organic di-and/or polyisocyanate is an isocyanate selected from the group consisting of methylenebis(phenylisocyanate, polymethylenepoly(phenylisocyanate), and mixtures thereof.

5. A process for preparing a reaction injection molded part by reacting a reaction mixture in a closed mold via the RIM process, said mixture consisting essentially of
    i) a relatively high molecular weight active hydrogen containing material,
    ii) an amine terminated chain extender and
    iii) the prepolymer of claim 1.

* * * * *